(12) United States Patent
Kim et al.

(10) Patent No.: US 12,136,880 B2
(45) Date of Patent: Nov. 5, 2024

(54) POWER CIRCUIT AND DISPLAY DEVICE INCLUDING THE SAME

(71) Applicant: LG Display Co., Ltd., Seoul (KR)

(72) Inventors: Bong Hwan Kim, Seoul (KR); Yeong Seok Choe, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/375,751

(22) Filed: Oct. 2, 2023

(65) Prior Publication Data

US 2024/0154530 A1    May 9, 2024

(30) Foreign Application Priority Data

Nov. 9, 2022  (KR) .......................... 10-2022-0148610

(51) Int. Cl.
| | | |
|---|---|---|
| *G09G 5/00* | (2006.01) | |
| *G09G 3/3233* | (2016.01) | |
| *H02M 1/00* | (2006.01) | |
| *H02M 3/158* | (2006.01) | |
| *G09G 3/36* | (2006.01) | |

(52) U.S. Cl.
CPC .......... *H02M 3/158* (2013.01); *G09G 3/3233* (2013.01); *H02M 1/0009* (2021.05); *G09G 3/3648* (2013.01); *G09G 2300/0842* (2013.01); *G09G 2310/0289* (2013.01); *G09G 2320/0223* (2013.01); *G09G 2330/021* (2013.01)

(58) Field of Classification Search
CPC ............... G09G 3/3233; G09G 3/3648; G09G 2300/0842; G09G 2310/0289; G09G 2320/0223; G09G 2330/021; H02M 1/0009; H02M 1/0032; H02M 3/156; H02M 3/158

See application file for complete search history.

(56) References Cited

U.S. PATENT DOCUMENTS

| | | | |
|---|---|---|---|
| 9,123,298 B2 | 9/2015 | Kim et al. | |
| 9,600,063 B2 * | 3/2017 | Laur | H02M 3/1584 |
| 9,721,524 B2 * | 8/2017 | Yoneyama | H03K 3/012 |
| 9,882,482 B1 * | 1/2018 | Hendry | H02M 3/158 |
| 10,181,853 B2 * | 1/2019 | Slattery | H03K 19/017581 |
| 11,402,456 B2 * | 8/2022 | Fortuny | G01R 1/203 |
| 2014/0043006 A1 * | 2/2014 | Tan | H03K 5/135 |
| | | | 323/298 |

FOREIGN PATENT DOCUMENTS

| | | | |
|---|---|---|---|
| JP | 2023053859 A | * | 4/2023 |
| KR | 10-2013-0043023 A | | 4/2013 |
| KR | 10-2022-0067706 A | | 5/2022 |
| KR | 20230005478 A | * | 1/2023 |

* cited by examiner

*Primary Examiner* — Joe H Cheng
(74) *Attorney, Agent, or Firm* — Morgan, Lewis & Bockius LLP

(57) ABSTRACT

The present disclosure relates to a power circuit and a display device including the same. The power circuit includes an output terminal configured to supply an output voltage to a digital circuit; a current sensing resistor connected to the output terminal; a sensing part configured to receive a first reference voltage and voltages of both ends of the current sensing resistor and vary one of a feedback voltage and a second reference voltage; and a voltage generation part configured to receive the feedback voltage and the second reference voltage and lowers the output voltage when a current flowing through the current sensing resistor decreases.

18 Claims, 15 Drawing Sheets

POWER CIRCUIT AND DISPLAY DEVICE INCLUDING THE SAME

CROSS-REFERENCE TO RELATED APPLICATION

This application claims priority to and the benefit of Korean Patent Application No. 10-2022-0148610, filed Nov. 9, 2022, the disclosure of which is incorporated herein by reference in its entirety.

BACKGROUND

1. Technical Field

The present disclosure relates to a power circuit and a display device including the same.

2. Discussion of the Related Art

A driving circuit of a flat panel display (FPD) device reproduces an input image on a pixel array by writing pixel data of the input image into pixels of a display panel. The driving circuit of this display device includes a data driving circuit for supplying pixel data signals to data lines, a gate driving circuit for supplying gate pulses to gate lines, a timing controller for controlling operation timing of the data driving circuit and the gate driving circuit, a power circuit, and the like.

The power circuit of the display device may be integrated into a power management integrated circuit (PMIC) and mounted on a printed circuit board (PCB) of the display device. This power circuit uses a DC-DC converter that receives DC voltage and outputs DC voltage to generate power necessary for driving the driving circuit and the pixels of the display panel.

In general, in order to minimize ripples in an output voltage, the PMIC maintains the output voltage constant through a feedback path, when the current of an output terminal is large and thus a voltage drop is large.

VDD outputted through the PMIC is supplied to a display driver integrated circuit (DDIC), in which the driving circuit of the display device is integrated, for internal logic operation of the DDIC. There are resistors between the PMIC and the DDIC, such as a bonding resistor and a wire routing resistor. Through such a resistor, VDD of a memory (SRAM) may be supplied to a digital logic circuit in the DDIC. VDD may be changed by IR (current*resistance) drop depending on load variation. The drop amount of VDD increases in proportion to the current. Due to the IR drop of VDD, if the voltage of VDD drops below the operating rate voltage range of the digital logic circuit, the memory and the digital logic circuit of the DDIC do not operate normally, so that a separate power source (VDDI) may be added, but this results in an increase in power consumption.

The operating rate voltage range is a voltage range recommended by the IC manufacturer as a stable operating voltage, and is a voltage range that guarantees various specifications. The voltage at which an IC starts to be damaged is called the "absolute rate". When using the IC, the input voltage needs to be used within the operating rate voltage range and the power should be managed to avoid exceeding the absolute rate.

If the PMIC increases the voltage of VDD in consideration of the IR drop of VDD, the VDD voltage applied to the DDIC instantaneously increases when a load suddenly decreases, which may cause damage or malfunction of the DDIC.

SUMMARY

Accordingly, embodiments of the present disclosure are directed to a power circuit and a display device including the same that substantially obviate one or more of the problems due to limitations and disadvantages of the related art An aspect of the present disclosure is to provide a power circuit and a display device including the same, capable of varying a driving voltage of a digital circuit within a stable voltage range when a load changes and reducing power consumption.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a power circuit comprises: an output terminal configured to supply an output voltage to a digital circuit; a current sensing resistor connected to the output terminal; a sensing part configured to receive a first reference voltage and voltages of both ends of the current sensing resistor and vary one of a feedback voltage and a second reference voltage; and a voltage generation part configured to receive the feedback voltage and the second reference voltage and lowers the output voltage when a current flowing through the current sensing resistor decreases.

The voltage generation part may include a buck converter circuit in which the output voltage is lower than an input voltage.

The sensing part may include a first differential amplifier configured to receive the voltages of both ends of the current sensing resistor; and a second differential amplifier configured to receive an output voltage of the first differential amplifier and the first reference voltage. An output voltage of the second differential amplifier may be one of the feedback voltage and the second reference voltage.

The voltage generation part may include a first transistor and an inductor connected in series between an input terminal and the output terminal; a second transistor connected between a node between the first transistor and the inductor and a ground voltage source; a controller configured to control the first and second transistors; and an amplifier and a comparator connected between the sensing part and the controller. The comparator may receive an output voltage of the amplifier and a triangular wave voltage and outputs a pulse width modulation (PWM) control signal. The amplifier may receive the second reference voltage and the feedback voltage. The controller may control the first and second transistors in response to the PWM control signal. The current sensing resistor may be connected between the inductor and the output terminal.

The feedback voltage outputted from the sensing part and the second reference voltage having a fixed voltage level may be inputted to the amplifier. The feedback voltage may be varied when the current flowing through the current sensing resistor changes.

When the current flowing through the current sensing resistor decreases, the output voltage of the amplifier may decrease, and the comparator may increase a duty ratio of the PWM control signal to lower a voltage applied to the inductor.

When the current flowing through the current sensing resistor increases, the output voltage of the amplifier may increase, and the comparator may decrease a duty ratio of the PWM control signal to raise a voltage applied to the inductor.

The first reference voltage may be higher than the second reference voltage.

The second reference voltage outputted from the sensing part and a node voltage between the current sensing resistor and the output terminal may be inputted to the amplifier. The second reference voltage may be varied when the current flowing through the current sensing resistor changes.

In another aspect, a display device comprises a display panel configured to display pixel data of an input image; a display panel driving circuit including a digital circuit driven by a VDD voltage and configured to write the pixel data to pixels of the display panel; and the power circuit configured to output the VDD voltage through a VDD output terminal.

According to the present disclosure, a driving voltage of the digital circuit may be varied within a stable voltage range when the load changes and power consumption may be reduced.

According to the present disclosure, the voltage of VDD may be stably managed such that the voltage applied to the digital circuit does not rise above the absolute rate when a load changes due to a load resistance and a change in the amount of current flowing through a memory and a digital logic circuit of a drive IC, e.g., DDIC, in which a driving circuit of the display device is integrated.

According to the present disclosure, when the load changes, the VDD voltage of the DDIC may be applied as an operating rate voltage, thereby optimizing power consumption and preventing malfunction and damage of the DDIC.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
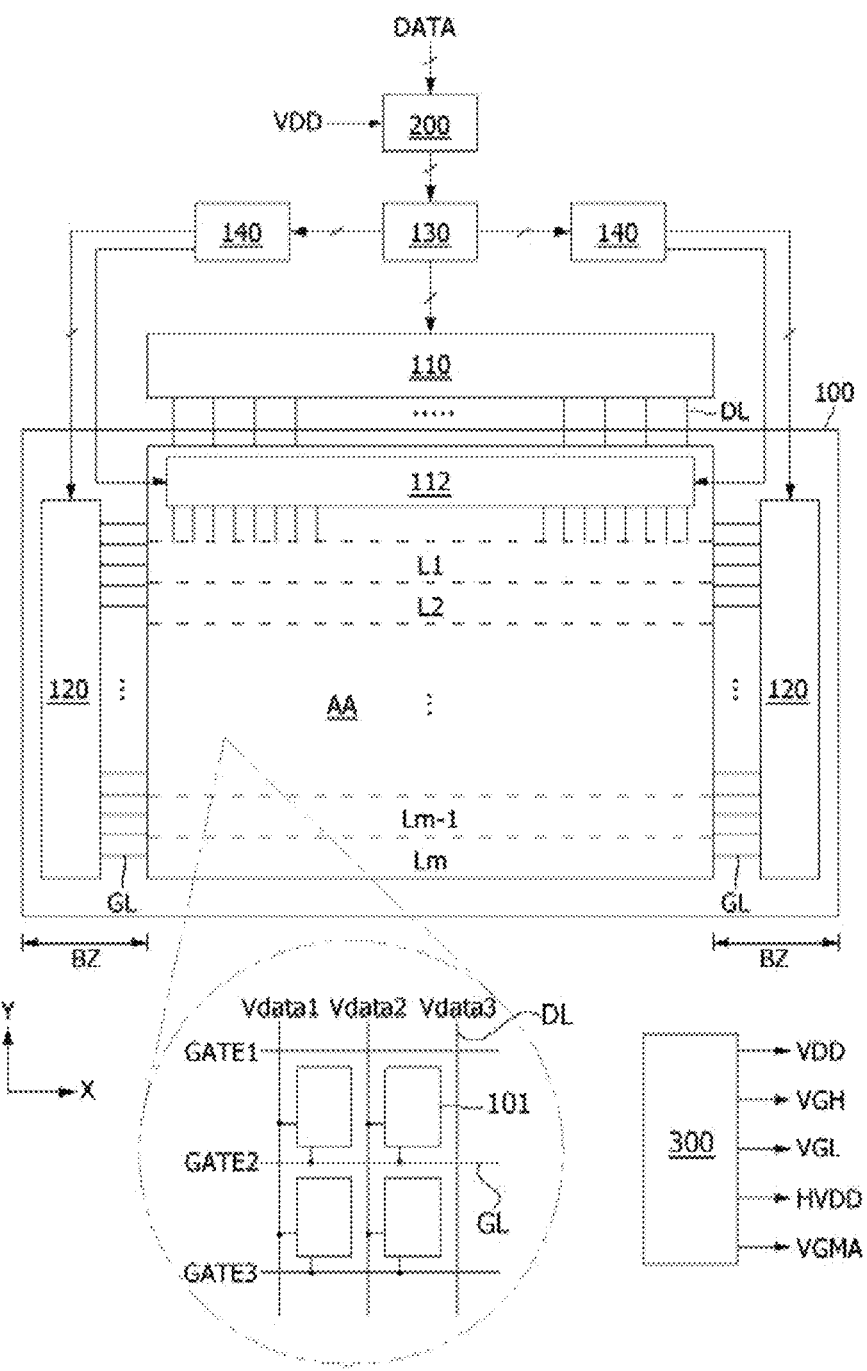
FIGS. 1 and 2 are block diagrams illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, using a term such as "on top of," "above," "below," "next to," "connect or couple with," "crossing," "intersecting," or the like, one or more other components may be interposed between them, unless "immediately" or "directly" is used.

When a temporal antecedent relationship is described, using a term such as "after", "following", "next to", "before", or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

The present disclosure is applicable to any flat panel display device, such as a liquid crystal display (LCD) or an organic light emitting display (OLED display), requiring a level shifter.

Hereinafter, various embodiments of the present disclosure will be described in detail with reference to the accompanying drawings.

Figure 2:
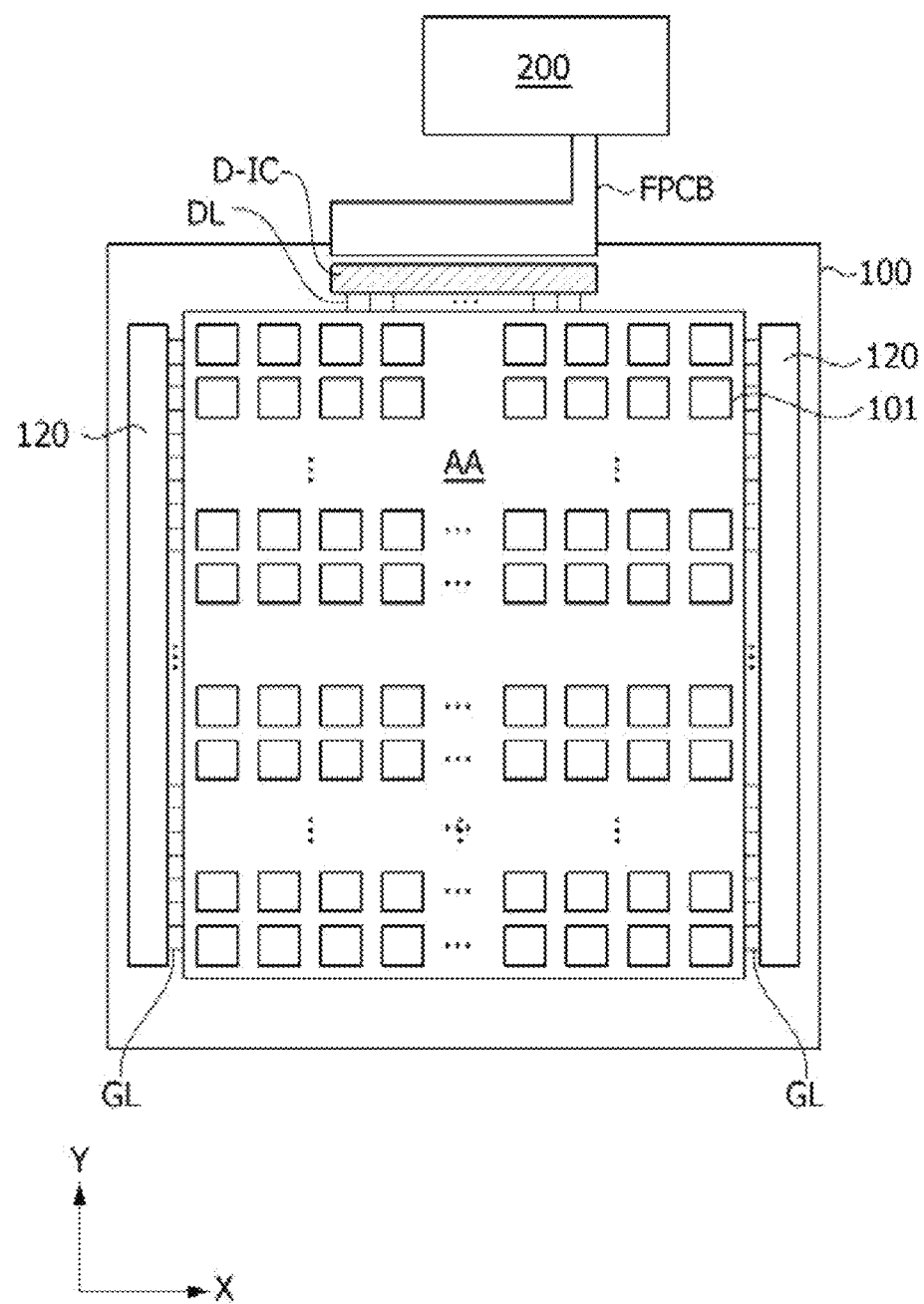

Referring to FIGS. 1 and 2, a display device according to an embodiment of the present disclosure includes a display panel 100 and a display panel driving circuit.

The display panel 100 displays pixel data of an input image. A display area on the screen of the display panel 100 includes a pixel array AA displaying the pixel data of the input image. The pixel data of the input image is displayed on pixels of the pixel array AA. The pixel array AA includes a plurality of data lines DL, a plurality of gate lines GL intersecting the data lines DL, and pixels arranged in a matrix form. The arrangement of the pixels may be formed in various forms, such as a form sharing pixels emitting the same color, a stripe form, and a diamond form, in addition to the matrix form.

Each of the pixels includes two or more sub-pixels 101 for color implementation. For example, each of the pixels may be divided into a red sub-pixel, a green sub-pixel, and a blue sub-pixel. Each of the pixels may further include a white sub-pixel. Each of the sub-pixels 101 includes a pixel circuit. The pixel circuit includes a pixel electrode, one or more thin film transistors (TFT), and a capacitor. The pixel circuit is connected to the data line DL and the gate line GL.

When the resolution of the pixel array AA is n*m, the pixel array AA includes n pixel columns and m pixel lines L1 to Lm intersecting the pixel columns. The pixel line includes sub-pixels disposed along a first direction X, and the sub-pixels disposed in one pixel line share the same gate line. The pixel column includes sub-pixels disposed along a second direction Y, and the sub-pixels disposed in one pixel column may share the same data line. One horizontal period 1H is a time obtained by dividing one frame period by the number of the m pixel lines L1 to Lm. The pixel data is written to pixels of one pixel line in one horizontal period 1H.

Touch sensors may be disposed on the display panel 100 to implement a touch screen. A touch input may be sensed using separate touch sensors or sensed through pixels. The touch sensors may be disposed on the screen of the display panel as on-cell type or add-on type touch sensors or may be implemented as in-cell type touch sensors embedded in the pixel array.

The display panel driving circuit may include a digital circuit driven by a VDD voltage and write the pixel data into the pixels of the display panel 100. The display panel driving circuit includes a data driver 110, a gate driver 120, a timing controller 130 for controlling the operation timing of the drivers 110 and 120, and a level shifter 140 connected between the timing controller 130 and the gate driver 120. The display panel driving circuit further includes a power supply 300.

The data driver 110 converts the pixel data of the input image received as a digital signal from the timing controller 130 into an analog gamma compensation voltage for each frame and outputs data signals Vdata1 to Vdata3. The data signals Vdata1 to Vdata3 outputted from the data driver 110 are supplied to the data lines DL. The data driver 110 outputs the data signals Vdata1 to Vdata3 by using a digital to analog converter (hereinafter referred to as "DAC") that converts a digital signal into an analog gamma compensation voltage. The data driver 110 may be integrated into a source drive IC. The source drive IC may be mounted on a chip on film (COF) and connected between a source PCB and the display panel. A touch sensor driver for driving the touch sensors may be embedded in each source drive IC.

The display panel driving circuit may further include a demultiplexer array 112 disposed between the data driver 110 and the gate driver 120.

The demultiplexer array 112 may sequentially connect one channel of the data driver 110 to the plurality of data lines DL to distribute a data voltage outputted from one channel of the data driver 110 to the data lines DL in a time division manner, thereby reducing the number of channels of the data driver 110.

The gate driver 120 may be formed in a bezel area BZ where an image is not displayed on the display panel 100, or may be at least partially disposed in the pixel array AA. The gate driver 120 receives a clock from the level shifter 140 and outputs a gate pulse GATE. Gate pulses GATE1 to GATE3 are supplied to the gate lines GL.

The gate pulses GATE1 to GATE3 supplied to the gate lines GL turn on switch elements of the sub-pixels 101 to select, on a pixel line basis, pixels of the pixel line to which the voltages of the data signals Vdata1 to Vdata3 are charged. The switch element of the sub-pixel 101 is turned on in response to a gate-on voltage VGH of the gate pulse GATE and turned off in response to a gate-off voltage. The gate pulse GATE swings between the gate-on voltage and the gate-off voltage. The gate driver 120 may shift the gate pulse using a shift register.

When the switch element is an n-channel transistor, the gate-on voltage may be a gate high voltage VGH, and the gate-off voltage may be a gate low voltage VGL. When the switch element is a p-channel transistor, the gate-on voltage may be the gate low voltage VGL and the gate-off voltage may be the gate high voltage VGH. A transistor used as a driving element and the switch element of the pixel circuit may be implemented as an oxide thin film transistor (TFT) including an oxide semiconductor, a low temperature poly silicon (LTPS) TFT including LTPS, or the like.

The timing controller 130 may multiply an input frame frequency by i (i being a positive integer greater than 0) times to control the operation timing of the display panel driver 110 and 120 with a frame frequency of the input frame frequency xi Hz. The input frame frequency is 60 Hz in a national television standards committee (NTSC) method and 50 Hz in a phase-alternating line (PAL) method.

The timing controller 130 receives the pixel data of the input image and a timing signal synchronized therewith from a host system 200. The pixel data of the input image received by the timing controller 130 is a digital signal. The timing controller 130 transmits the pixel data to the data driver 110. The timing signal includes a vertical synchronization signal Vsync, a horizontal synchronization signal Hsync, a clock signal DCLK, a data enable signal DE, and the like. Since a vertical period and a horizontal period can be known by counting the data enable signal DE, the vertical synchronization signal Vsync and the horizontal synchronization signal Hsync may be omitted. The data enable signal DE has a cycle of one horizontal period 1H.

Based on the timing signal received from the host system 200, the timing controller 130 may generate a data timing control signal for controlling the data driver 110, a gate timing control signal for controlling the gate driver 120, a control signal for controlling switch elements of the demultiplexer array 112, and the like. The gate timing control signal may be generated as a clock of a digital signal voltage level.

The host system 200 may include a main board of any one of a television (TV), a set-top box, a navigation system, a personal computer (PC), a home theater, a mobile system, and a wearable system. The host system 200 transmits image data DATA from a video source to the timing controller 130 or a drive IC (D-IC) for a display device. In a system such as a mobile device or a wearable device, as shown in FIG. 2, the data driver 110, the timing controller 130, the level shifter 140, and the like may be integrated into one drive IC (D-IC), e.g., DDIC. In a mobile system, the host system 200 may be implemented with an application processor (AP). In this case, the host system 200 may transmit the pixel data of the input image to the drive IC through a mobile industry processor interface (MIPI). The host system 200 may be connected to the drive IC through a flexible printed circuit board (FPC).

The display panel driving circuit may operate in a low-speed driving mode under the control of the timing controller 130. In the low-speed driving mode, the input image may be analyzed and when the input image does not change for a predetermined period of time, power consumption of the display device may be reduced. In the low-speed driving mode, when a still image is inputted over a certain period of time, a refresh rate at which the pixel data is written into the pixels may be lowered to control a data write cycle of pixels P to be lengthened, thereby reducing the power consumption. In the low-speed driving mode, the pixel data is not written to the pixels in a skip frame, and a previous data voltage is maintained. The low-speed driving mode is not limited to when a still image is inputted. For example, when the display device operates in a standby mode or a user command or an input image is not inputted to the display panel driving circuit over a predetermined period of time, the display panel driving circuit may operate in the low-speed driving mode.

The display panel driving circuit may be driven in an always-on display (AoD) mode under the control of the timing controller 130, and thus may continuously display messages such as date, time, battery level, and notification on the pixels in a predetermined AoD area in a state where the image data is not displayed on the screen.

The level shifter 140 may receive a clock of the gate timing control signal from the timing controller 130 and generate a shift clock for driving circuits such as the gate driver 120 and the demultiplexer array 112.

The power supply 300 uses a DC-DC converter to generate voltages required to drive the pixel array of the display panel 100 and the display panel driving circuit. The DC-DC converter may include a charge pump, a regulator, a buck converter, a boost converter, a buck-boost converter, and the like. The power supply 300 may be integrated into a power IC 300a shown in FIGS. 3 and 4.

The power supply 300 may adjust a DC input voltage from the host system 200 to generate DC voltages such as a gamma reference voltage VGMA, the gate-on voltage VGH, the gate-off voltage VGL, VDD, HVDD, and a common voltage of the pixels. VDD may be a driving voltage of a digital circuit included in the display panel driving circuit. For example, VDD may be supplied to a memory and a digital logic circuit of the timing controller 130. Half of the VDD voltage may be used as an output buffer driving voltage of the data driver 110. The gamma reference voltage VGMA is supplied to the data driver 110. The gamma reference voltage VGMA is divided for each grayscale by a voltage divider circuit of the data driver 110 and supplied to the DAC of the data driver 110. The power supply 300 may generate constant voltages, e.g., a common voltage Vcom, a pixel driving voltage EVDD, a pixel base voltage EVSS, and the like, applied to the pixels in common. The power supply 300 may change the voltage level of an output voltage under the control of the timing controller 130.

As shown in FIGS. 11 to 16, the buck converter of the power supply 300 may include an output terminal connected to a load and supplying voltage to the load, a sensing part for sensing a change in the load connected to the output terminal, and a voltage generation part that reduces the output voltage when the load decreases. The buck converter may sense the voltage and/or current of the output terminal, which changes when the load changes, and reduce the output voltage when the voltage and/or current of the output terminal is below a specific level (reference voltage level). In addition, the buck converter may increase the output voltage to supply stably the power to the load when the IR drop of the output voltage is large due to a rapid increase in the amount of load current. As a result, the buck converter may prevent the phenomena that the voltage applied to the load becomes lower than an operating rate voltage due to the large IR drop of the output voltage, and the voltage applied to the load becomes higher than an absolute rate voltage due to the relatively small IR drop of the output voltage. Here, the load may include a digital circuit of the display panel driving circuit and a resistor between an output terminal of the buck converter and the display panel driving circuit.

Figure 3:
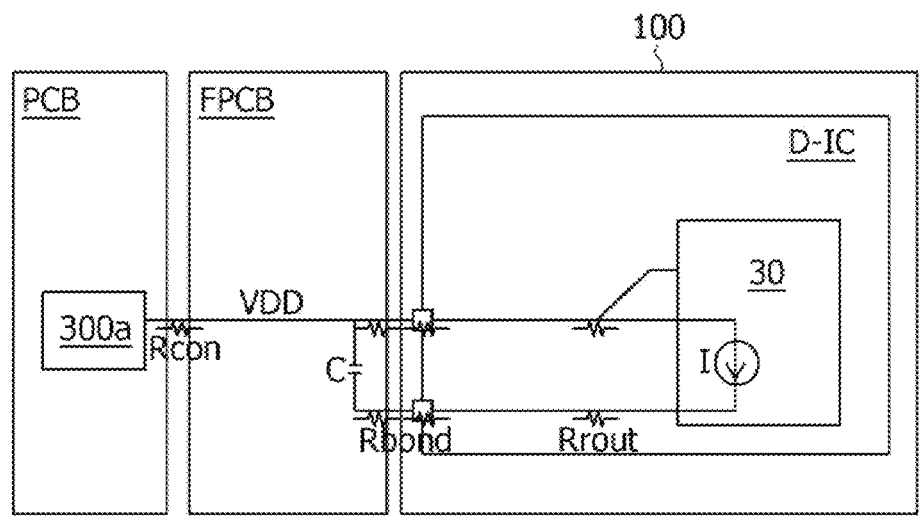
FIGS. 3 and 4 are diagrams illustrating a connection structure between a power IC and a digital circuit according to an embodiment of the present disclosure.
Figure 4:
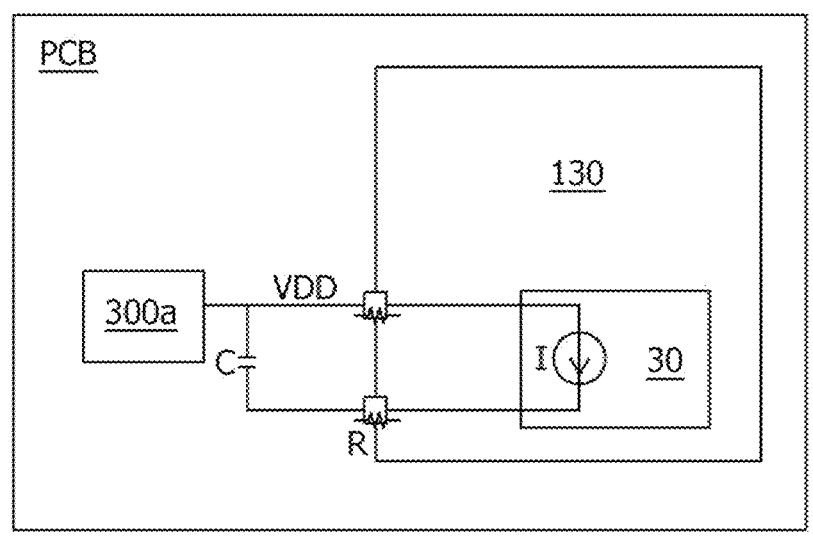

FIGS. 3 and 4 are diagrams illustrating a connection structure between a power IC and a digital circuit according to an embodiment of the present disclosure. FIG. 3 may be an example applied to a mobile device, and FIG. 4 may be an example applied to a medium-large device, but the present disclosure is not limited thereto.

Referring to FIG. 3, the power IC 300a includes a power supply 300 and is mounted on a PCB. The PCB may be electrically connected to the display panel 100 through, e.g., a flexible printed circuit board (FPCB). A power output terminal of the PCB and a power input terminal of the FPCB may be connected through a connector. A power output terminal of the FPCB may be attached to a power input terminal of the display panel 100 through an anisotropic conductive film (ACF) to be electrically connected to the drive IC D-IC attached onto the display panel 100. The drive IC D-IC may be attached to the display panel 100 through the ACF in a chip-on-glass (COG) process. VDD outputted from the power IC 300a is supplied to a digital circuit 30 of the drive IC D-IC. The load connected to a VDD output terminal of the power IC 300a includes a connector resistor Rcon, a bonding resistor Rbond, a capacitor C connected to a wire, a routing resistor Rrout of the wire, and the digital circuit 30 of the drive IC D-IC. The capacitor C may include parasitic capacitance.

Referring to FIG. 4, the power IC 300a and the timing controller 130 may be mounted on the PCB. The PCB may be electrically connected to the display panel 100 through, e.g., a flexible printed circuit board (FPCB). VDD outputted from the power IC 300a is supplied to the digital circuit 30 of the timing controller 130. The load connected to the VDD output terminal of the power IC 300a includes a capacitor C and a resistor R of a wire and the digital circuit 30 of the timing controller 130.

The digital circuit 30 may include a digital logic circuit or a processor that performs an algorithm for image quality improvement. A memory of the digital circuit 30 may temporarily store the pixel data of the input image or data from the digital logic circuit. In FIGS. 3 and 4, reference symbol 'I' in the digital circuit 30 indicates a current.

Figure 5:
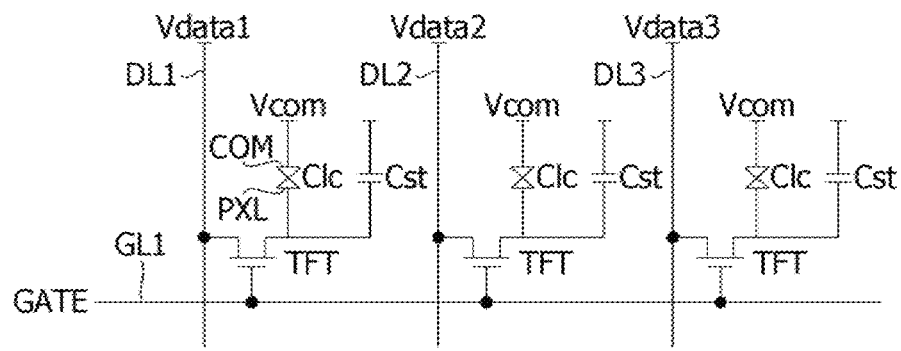
FIGS. 5 and 6 are circuit diagrams illustrating a pixel circuit according to an embodiment of the present disclosure.
Figure 6:
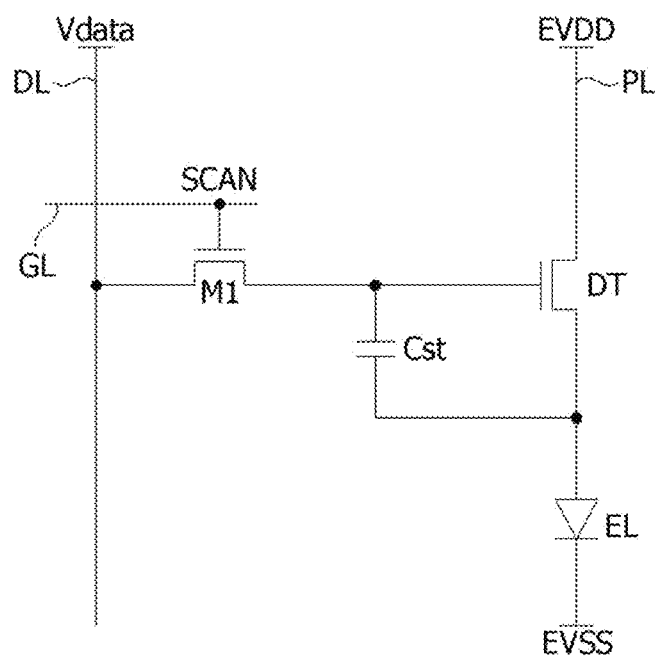

FIGS. 5 and 6 are circuit diagrams illustrating pixel circuits according to an embodiment of the present disclosure. FIG. 5 is a pixel circuit of a liquid crystal display device, and FIG. 6 is a pixel circuit of an organic light emitting display device. It should be noted that the pixel circuit of the present disclosure is not limited to those in FIGS. 5 and 6.

Referring to FIG. 5, the pixel circuit includes a pixel electrode PXL, a common electrode COM, a liquid crystal cell Clc, and a TFT and a storage capacitor Cst connected to the pixel electrode PXL. The TFT is formed at the intersection of a gate line GL1 and data lines DL1 to DL3. The TFT supplies the data signal Vdata1, Vdata2, or Vdata3 from the data line DL1 to DL3 to the pixel electrode PXL in response to the gate pulse GATE from the gate line GL1.

Referring to FIG. 6, the pixel circuit includes a light emitting element EL, a driving element DT that supplies a current to the light emitting element EL, a switch element M1 that supplies a data signal Vdata to the gate electrode of the driving element DT in response to the gate pulse GATE, and a capacitor Cst connected between the gate electrode and the source electrode of the driving element DT. At least one of the driving element DT and the switch element M1 may be implemented with a thin film transistor (TFT). For example, both the driving element DT and the switch element M1 may be implemented with the TFT.

The pixel driving voltage EVDD may be applied to the drain electrode of the driving element DT through a power line PL connected to the pixels in common. The driving element DT drives the light emitting element EL by supplying a current to the light emitting element EL according to a gate-source voltage Vgs. The switch element M1 is turned on in response to the gate-on voltage VGH of the gate pulse GATE. The light emitting element EL is turned on to emit light when a forward voltage between the anode electrode and the cathode electrode is greater than or equal to a threshold voltage. The pixel base voltage EVSS lower than the pixel driving voltage EVDD is applied to the cathode electrode of the light emitting element EL. The capacitor Cst is connected between the gate electrode and the source electrode of the driving element DT to maintain the gate-source voltage Vgs of the driving element DT.

The light emitting element EL may be implemented with an organic light emitting diode (OLED) including an organic compound layer formed between an anode and a cathode. The organic compound layer may include a hole injection layer (HIL), a hole transport layer (HTL), an emission layer (EML), an electron transport layer (ETL), and an electron injection layer (EIL), but is not limited thereto. When a voltage is applied to the anode and cathode electrodes of the OLED, holes passing through the hole transport layer (HTL) and electrons passing through the electron transport layer (ETL) move to the emission layer (EML) to form excitons, so that visible light is emitted from the emission layer EML.

According to an embodiment, the OLED used as the light emitting element may have a tandem structure in which a plurality of emission layers are stacked. The OLED with a tandem structure may improve the luminance and lifetime of a pixel.

There may be a difference in electrical characteristics of driving elements between pixels due to process deviation and element characteristic deviation caused in a manufacturing process of the display panel. The difference in electrical characteristics of the driving elements may increase as the driving time of the pixels elapses. In order to compensate for the electrical characteristic deviation of the driving elements DT between pixels, an internal compensation circuit may be included in the pixel circuit or an external compensation circuit may be connected to the pixel circuit.

The voltage of VDD outputted from the power IC 300a may change depending on load variation. When the load changes, the IR drop amount of VDD also changes due to a resistive component. When the load connected to the VDD output terminal is high (heavy load), the IR drop amount of VDD increases and VDD inputted to the digital circuit 30 decreases. On the other hand, when the load is low (light load), the IR drop amount of VDD decreases and a relatively large VDD is inputted to the digital circuit 30, which may cause damage or malfunction of the digital circuit 30.

In general, a power IC outputs a DC voltage at a preset voltage level, and includes a feedback compensation circuit that senses load variation to maintain a constant voltage level of the output DC voltage when the load changes. For example, in the case of a general buck converter, an output voltage is kept constant by increasing a pulse width modulation (PWM) duty ratio when the load decreases (light load). In contrast, the power IC 300a according to an embodiment of the present disclosure senses the load variation in real time at the output terminal and adaptively changes the voltage level of VDD when the load changes. For example, in the embodiment of the present disclosure, when the load decreases, the VDD voltage outputted from the power IC 300a may be lowered to prevent damage or malfunction of the digital circuit, so that the digital circuit may be stably driven. In the embodiment of the present disclosure, the VDD voltage outputted from the power IC 300a is increased when the load increases, while the VDD voltage is decreased when the load decreases, so that the digital circuit 30 may be stably driven when the load changes.

Figure 7:
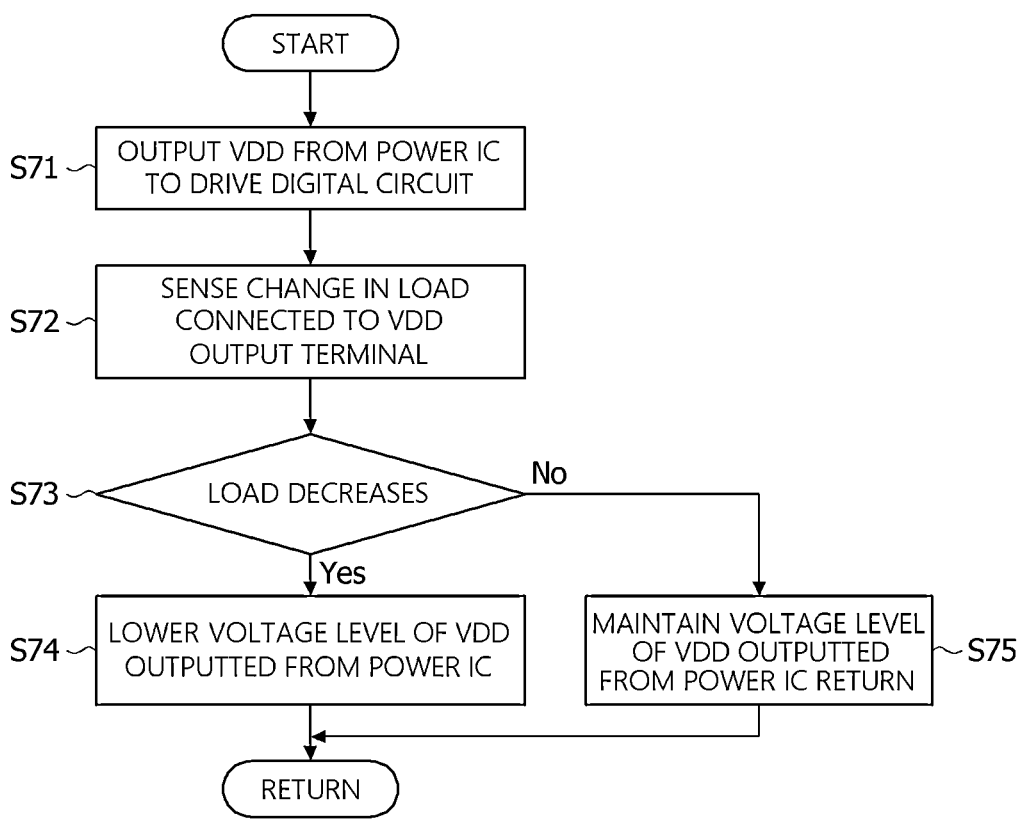
FIG. 7 is a flowchart illustrating an operation of a power IC according to an embodiment of the present disclosure.

FIG. 7 is a flowchart illustrating an operation of a power IC according to an embodiment of the present disclosure.

Referring to FIG. 7, the power IC 300a outputs VDD of a preset basic voltage level (step S71). The power IC 300a may sense the load variation using a sensing circuit connected to the VDD output terminal (step S72). The power IC 300a lowers the voltage level of VDD at a low load (steps S73 and S74). In this case, the voltage level of VDD supplied to the digital circuit 30 is lower than the basic voltage level.

The power IC 300a may maintain the voltage level of VDD at the basic voltage level when there is no change in the IR drop amount of VDD or when the IR drop amount of VDD is greater than a predetermined reference value (step S75). In this embodiment, the basic voltage level of VDD may be set to V3 in FIG. 9.

The basic voltage level of VDD may be appropriately lowered within a voltage range in which the digital circuit 300a can stably operate, and the voltage level of VDD may be increased when the load increases.

Figure 8:
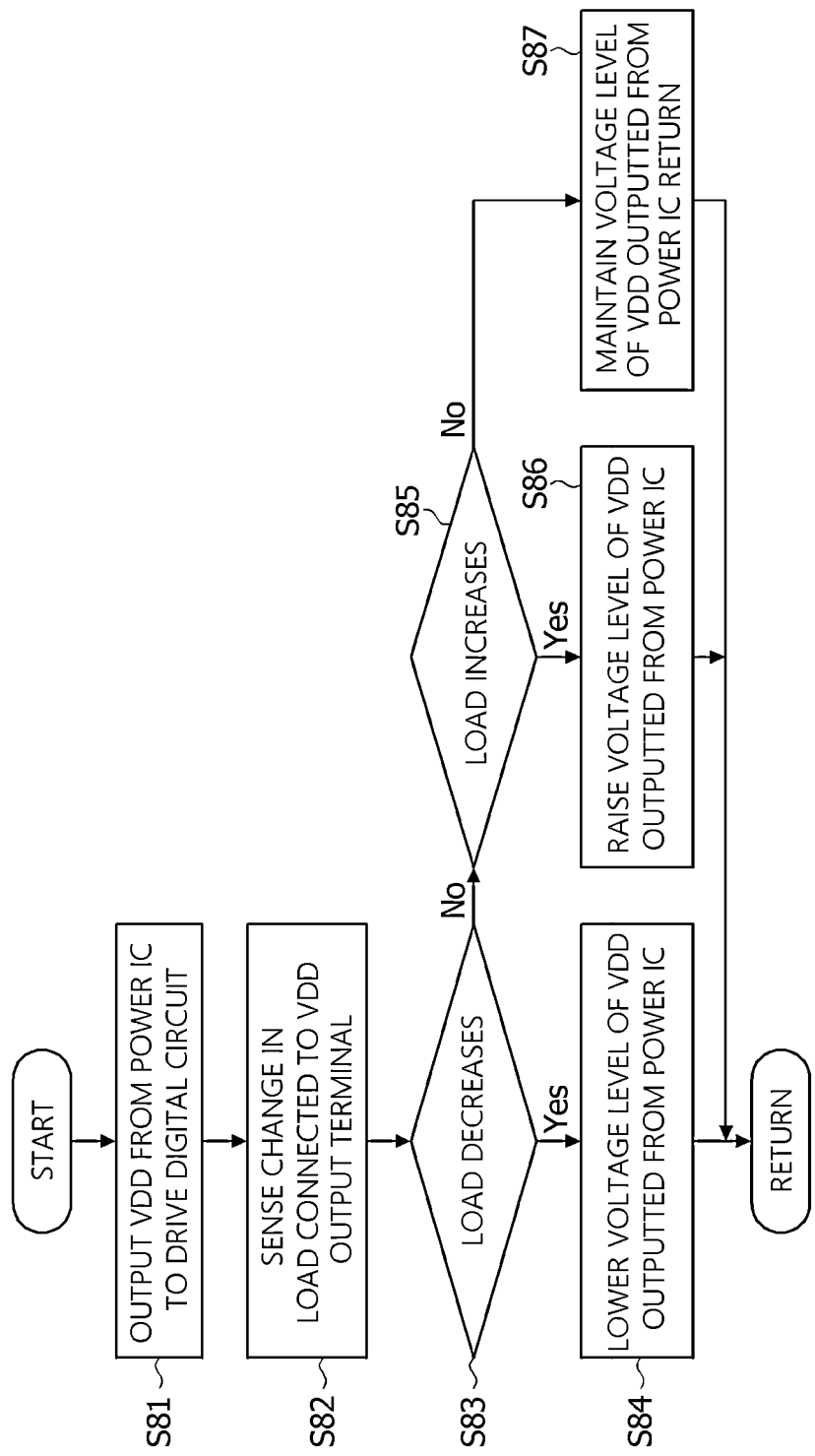
FIG. 8 is a flowchart illustrating an operation of a power IC according to another embodiment of the present disclosure.

FIG. 8 is a flowchart illustrating an operation of a power IC according to another embodiment of the present disclosure.

Referring to FIG. 8, the power IC 300a outputs VDD of a preset basic voltage level (step S81). The power IC 300a may sense the load variation in real time using a sensing circuit connected to the VDD output terminal (step S82). The power IC 300a lowers the voltage level of VDD when the load decreases (steps S83 and S84). In this case, the voltage level of VDD supplied to the digital circuit 30 is lower than the basic voltage level.

The power IC 300a may increase the voltage level of VDD at a high load (steps S85 and S86). The power IC 300a may maintain the voltage level of VDD at the basic voltage level when the load hardly changes within a preset reference range (step S87). The upper and lower limits of the reference range may be determined based on experimental results. In this embodiment, the basic voltage level of VDD may be set to V2 in FIG. 9.

Figure 9:
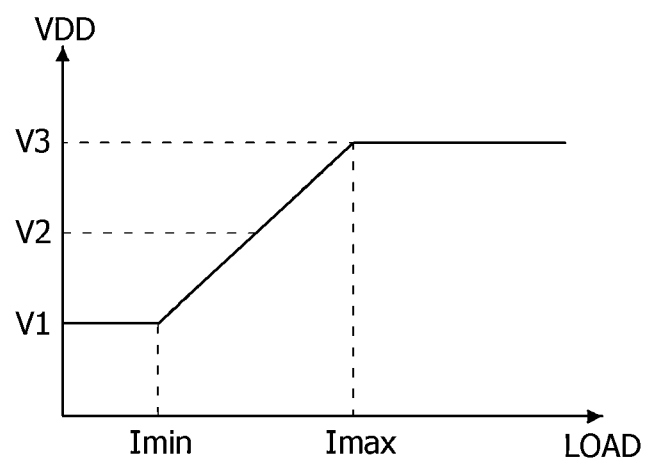
FIG. 9 is a diagram illustrating a VDD voltage depending on a variation of a load connected to a VDD output terminal of a power IC of the present disclosure.

FIG. 9 is a diagram showing a VDD voltage according to the variation of a load connected to a VDD output terminal of a power IC according to an embodiment of the present disclosure. In FIG. 9, the horizontal axis indicates a load current sensed at the VDD output terminal of the power IC 300a, and the vertical axis indicates the VDD voltage outputted from the power IC 300a.

Referring to FIG. 9, the power IC 300a changes the voltage of VDD when the load current sensed in real time from the VDD output terminal changes.

As shown in FIG. 7, when the load current sensed in real time from the VDD output terminal decreases, the power IC 300a may lower the voltage level of VDD below the basic voltage level. In addition, as shown in FIG. 8, the power IC 300a may lower the voltage level of VDD when the load current sensed in real time from the VDD output terminal decreases, but may raise the voltage level of VDD when the load current increases.

Reference symbol 'Imin' in FIG. 9 is the minimum value of a current flowing through the VDD output terminal when the current decreases within a variable range V1 to V3 of VDD outputted from the power IC 300a. Reference symbol 'Imax' in FIG. 9 is the maximum value of the current flowing through the VDD output terminal when the current increase.

Figure 10A:
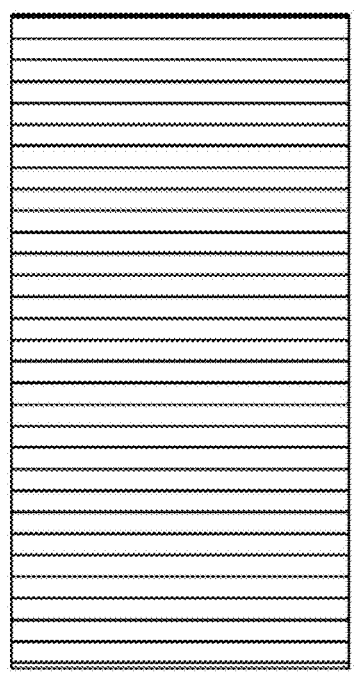
FIGS. 10A and 10B are diagrams illustrating an example of an image pattern in which a change in a load sensed at a VDD output terminal of a power IC is caused.
Figure 10A:
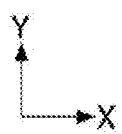
Figure 10B:
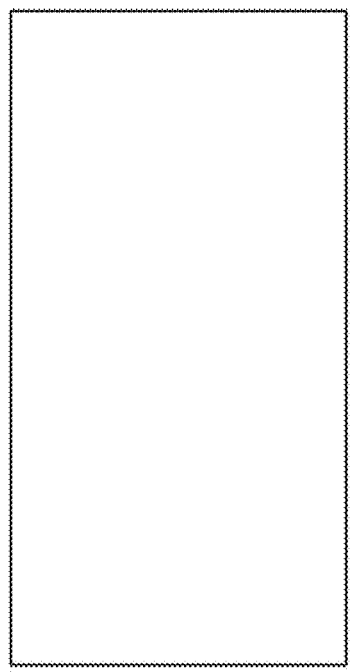

The current of the load connected to the VDD output terminal of the power IC 300a may vary depending on the driving state of the digital circuit 30 and the pattern of the input image. For example, as shown in FIG. 10A, in the case of an image pattern in which a grayscale value varies greatly between adjacent pixel lines, a current flowing through the digital circuit 30 and the display panel 100 increases. On the other hand, as shown in FIG. 10B, when pixel data of the same grayscale, e.g., white grayscale, is written to all pixels, the current of the digital circuit 30 and the display panel 100 decreases. In the always-on-display (AoD) mode, the skip frame in the low-speed driving mode, and the like, the load connected to the VDD output terminal decreases and the current flowing through the VDD output terminal is reduced. When the pixel data is written to the pixels in every frame at a high frame frequency, such as 120 Hz, 144 Hz, or 240 Hz, of the input image, the current flowing through the VDD output terminal increases and thus the IR drop amount of VDD increases. In the case where such a load variation occurs, the power IC 300a may be driven in the same manner as in FIG. 7 or FIG. 8 to lower the VDD voltage when the current flowing to the load decreases, and to raise the VDD voltage when the current flowing to the load increases. Here, the load includes resistance and capacitance of the digital circuit 30 and the display panel 100.

Figure 11:
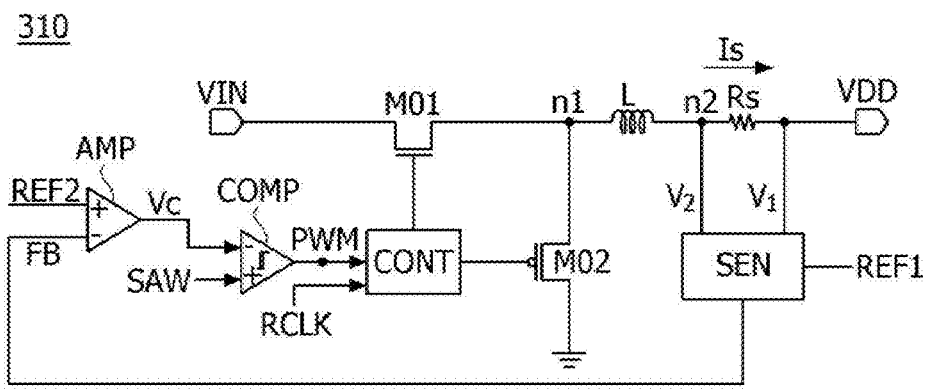
FIG. 11 is a circuit diagram illustrating a buck converter according to an embodiment of the present disclosure.
Figure 12:
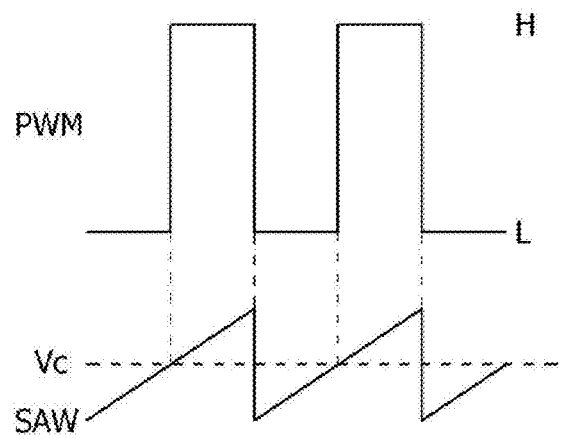
FIG. 12 is a waveform diagram illustrating an example of an output voltage of an amplifier, a triangular wave voltage, and a PWM control signal.
Figure 13:
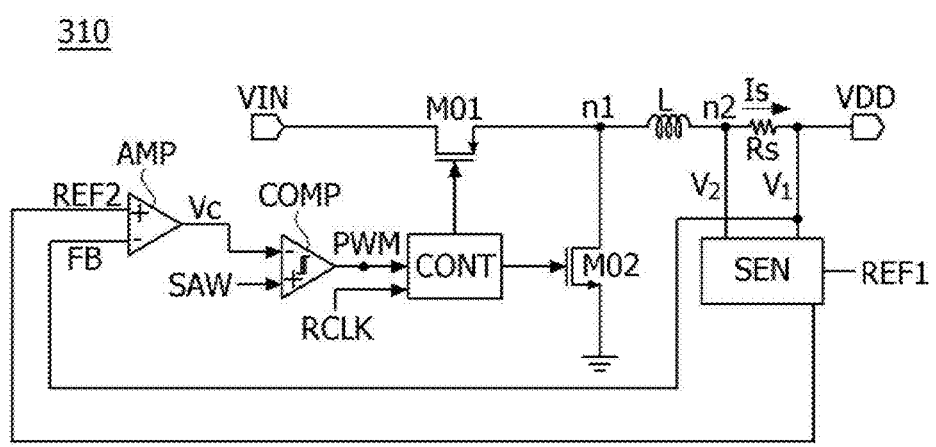
FIG. 13 is a circuit diagram illustrating a buck converter according to another embodiment of the present disclosure.

The power IC 300a according to an embodiment of the present disclosure may use a power circuit 310 as shown in FIGS. 11 to 13 to output VDD for driving the digital circuit 30, and may sense the current of the load connected to the VDD output terminal and vary the voltage level of VDD when the load changes.

FIG. 11 is a circuit diagram illustrating a power circuit 310 according to an embodiment of the present disclosure.

Referring to FIG. 11, the power circuit 310 outputs VDD of the basic voltage level by lowering an input voltage VIN supplied to an input terminal, and as shown in FIG. 9, varies the VDD voltage depending on the current variation of the load.

The power circuit 310 may include the VDD output terminal connected to the load and supplying VDD to the load, a current sensing resistor Rs connected to the VDD output terminal, a sensing part (or sensing circuit) SEN connected to both ends of the current sensing resistor Rs, and a voltage generation part (or voltage generation circuit). The load may include a resistor and the digital circuit of the display panel driving circuit. The voltage generation part includes a buck converter circuit.

The voltage generation part may include: a first transistor M01 and an inductor L connected in series between the input terminal and the VDD output terminal; a second transistor M02 connected between a first node n1, which is between the first transistor M01 and the inductor L, and a ground voltage source GND; a controller CONT that controls the first and second transistors M01 and M02; and an amplifier AMP and a comparator COMP connected between the sensing part SEN and the controller CONT. The first transistor M01 may be a p-channel transistor, and the second transistor M02 may be an n-channel transistor, but they are not limited thereto. The voltage generation part may be referred to as a voltage generation circuit.

The output terminal of the power circuit 310 is connected to the load including a resistor and the digital circuit 30. When the load increases, the IR drop amount of VDD increases and thus the voltage of VDD decreases relatively significantly. On the other hand, when the load decreases, the IR drop amount of VDD is relatively decreases. Accordingly, the VDD voltage applied to the digital circuit may increase when the load connected to the VDD output terminal decreases rather than when the load increases.

The current sensing resistor Rs is connected in series between the inductor L and the VDD output terminal. One end of the current sensing resistor Rs is connected to the VDD output terminal, and the other end thereof is connected to a second node n2 between the inductor L and the current sensing resistor Rs.

The sensing part SEN receives voltages $V_1$ and $V_2$ at both ends of the current sensing resistor Rs and a first reference voltage REF1 and senses a current Is flowing through the current sensing resistor Rs to sense the load variation in real time. The first reference voltage REF1 inputted to the sensing part SEN is set to a voltage higher than a second reference voltage REF2 of the amplifier AMP. The first reference voltage REF1 may be varied by the host system 200 or the timing controller 130. In this embodiment, the second reference voltage REF2 is a constant voltage having a fixed voltage level.

The sensing part SEN increases a feedback voltage FB applied to a feedback input terminal of the amplifier AMP when the current Is flowing through the current sensing resistor Rs decreases. On the other hand, the sensing part SEN decreases the feedback voltage FB when the current Is flowing through the current sensing resistor Rs increases. The sensing part SEN may be referred to as a sensing circuit.

The amplifier AMP amplifies a voltage difference between the second reference voltage REF2 applied to a reference voltage input terminal and the feedback voltage FB applied to the feedback input terminal by its own gain. The amplifier AMP increases an output voltage Vc inputted to the comparator COMP when the output voltage, i.e., the feedback voltage FB, of the sensing part SEN is lower than the second reference voltage REF2, and decreases the output voltage Vc inputted to the comparator COMP when the feedback voltage FB is higher than the second reference voltage REF2.

The comparator COMP includes a first input terminal to which the output voltage Vc of the amplifier AMP is applied, and a second input terminal to which a triangular wave voltage SAW shown in FIG. 12 is applied. The comparator COMP compares the output voltage Vc of the amplifier AMP with the triangular wave voltage SAW to output a PWM control signal PWM.

FIG. 12 shows an example of the output voltage Vc of the amplifier AMP, the triangular wave voltage SAW, and the PWM control signal PWM. The PWM control signal is generated at a high voltage H when the triangular wave voltage SAW is higher than the output voltage Vc of the amplifier AMP, and is generated at a low voltage L when the triangular wave voltage SAW is lower than the output voltage Vc of the amplifier AMP.

As can be seen in FIG. 12, the comparator COMP raises the duty ratio of the PWM control signal when the output voltage Vc of the amplifier AMP decreases, and lowers the duty ratio of the PWM control signal when the output voltage Vc of the amplifier AMP increases.

The controller CONT receives the PWM control signal PWM and a reference clock RCLK. The reference clock RCLK is synchronized with the triangular wave voltage SAW. The controller CONT complementarily controls the first and second transistors M01 and M02 in response to the PWM control signal PWM to raise the VDD voltage when the duty ratio of the PMW control signal PWM is low, and lower the VDD voltage when the duty ratio of the PWM control signal PWM is high.

The first transistor M01 includes a gate electrode to which a control signal from the controller CONT is applied, a first electrode connected to the input terminal, and a second electrode connected to the inductor L. When the first transistor M01 is a p-channel transistor, the first transistor M01 is turned on during a low level period of the PWM control signal PWM and turned off during a high level period of the PWM control signal PWM.

The second transistor M02 includes a gate electrode to which a control signal from the controller CONT is applied, a first electrode connected to the first node n1 between the first transistor M01 and the inductor L, and a second electrode connected to the ground voltage source GND. The second transistor M02 is turned off during the low level period of the PWM control signal PWM and turned on during the high level period of the PWM control signal PWM.

FIG. 13 is a circuit diagram illustrating a power circuit 310 according to another embodiment of the present disclosure. In FIG. 13, a detailed description of a configuration substantially the same as that of the buck converter of the above-described embodiment will be omitted.

Referring to FIG. 13, the power circuit 310 outputs VDD of the basic voltage level by lowering an input voltage VIN supplied to an input terminal, but as shown in FIG. 9, varies the VDD voltage depending on the current variation of the load.

The power circuit 310 may include the VDD output terminal connected to the load and supplying VDD to the load, a current sensing resistor Rs connected to the VDD output terminal, a sensing part SEN connected to both ends of the current sensing resistor Rs, and a voltage generation part. The voltage generation part includes a buck converter circuit.

The voltage generation part may include: a first transistor M01 and an inductor L connected in series between the input terminal and the VDD output terminal; a second transistor M02 connected between a node n1, which is between the first transistor M01 and the inductor L, and a ground voltage source GND; a controller CONT that controls the first and second transistors M01 and M02; and an amplifier AMP and a comparator COMP connected between the sensing part SEN and the controller CONT.

The sensing part SEN receives voltages $V_1$ and $V_2$ at both ends of the current sensing resistor Rs and a first reference voltage REF1 and senses a current Is flowing through the current sensing resistor Rs to sense the load variation in real time. The first reference voltage REF1 inputted to the sensing part SEN is set to a voltage higher than a second reference voltage REF2 of the amplifier AMP. The second reference voltage REF2 is varied by the sensing part SEN when the load changes. The first reference voltage REF1 may be varied by the host system 200 or the timing controller 130.

The sensing part SEN increases the second reference voltage REF2 applied to a reference voltage input terminal of the amplifier AMP when the current Is flowing through the current sensing resistor Rs decreases. On the other hand, the sensing part SEN decreases the second reference voltage REF2 when the current Is flowing through the current sensing resistor Rs increases.

Figure 14:
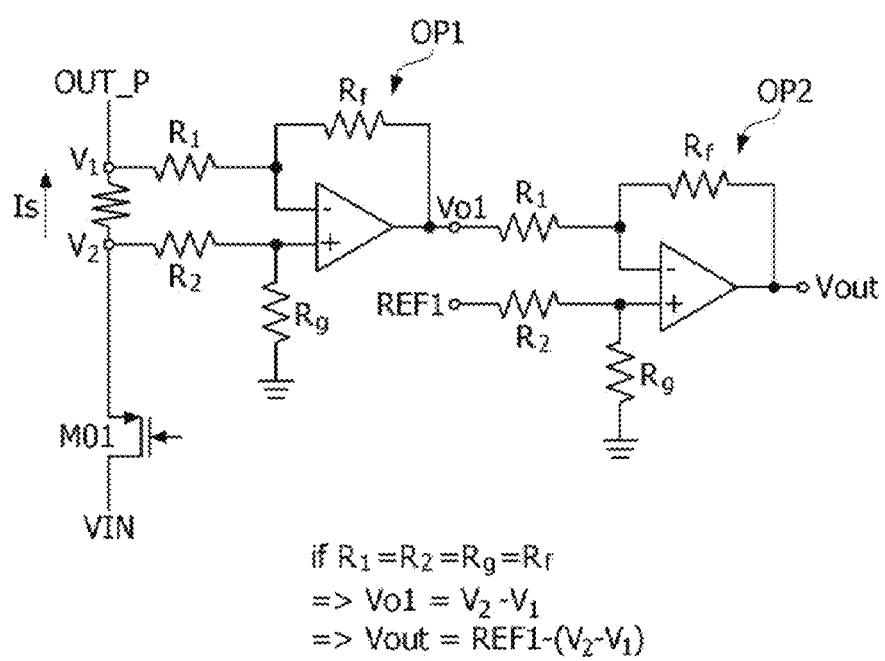
FIG. 14 is a circuit diagram illustrating a sensing part in detail according to an embodiment of the present disclosure.

FIG. 14 is a circuit diagram illustrating a sensing part in detail according to an embodiment of the present disclosure.

Referring to FIG. 14, the sensing part SEN includes a first differential amplifier OP1 that receives the voltages $V_1$ and $V_2$ of both ends of the current sensing resistor Rs, and a second differential amplifier OP2 that receives an output voltage Vol of the first differential amplifier OP1 and the first reference voltage REF1. In FIG. 14, reference symbol 'OUT_P' indicates the voltage of the VDD output terminal, i.e., VDD.

In the case of the buck converter shown in FIG. 11, an output voltage Vout of the second differential amplifier OP2 is the feedback voltage FB. In the case of the buck converter shown in FIG. 13, the output voltage Vout of the second differential amplifier OP2 is the second reference voltage REF2.

A first input resistor $R_1$ of the first differential amplifier OP1 is connected between one end of the current sensing resistor Rs and the negative input terminal of a first operational amplifier. A second input resistor $R_2$ of the first differential amplifier OP1 is connected between the other end of the current sensing resistor Rs and the positive input terminal of the first operational amplifier. A ground resistor $R_g$ of the first differential amplifier OP1 is connected between the positive input terminal of the first operational amplifier and the ground voltage source GND. A feedback resistor $R_f$ of the first differential amplifier OP1 is connected between the negative input terminal of the first operational amplifier and the output terminal of the first operational amplifier.

A first input resistor $R_1$ of the second differential amplifier OP2 is connected between the output terminal of the first operational amplifier and the negative input terminal of a second operational amplifier, and a second input resistor $R_2$ thereof is connected to the positive input terminal of the second operational amplifier. The first reference voltage REF1 is applied to the second input resistor $R_2$ of the second differential amplifier OP2. A ground resistor $R_g$ of the second differential amplifier OP2 is connected between the positive input terminal of the second operational amplifier and the ground voltage source GND. A feedback resistor $R_f$ of the second differential amplifier OP2 is connected between the negative input terminal of the second operational amplifier and the output terminal of the second operational amplifier.

A difference voltage between two input voltages of the first and second differential amplifiers OP1 and OP2 is outputted. The output voltage Vout may be adjusted by appropriately adjusting the resistance values of the resistors $R_1$, $R_2$, $R_g$, and $R_f$ of the differential amplifier OP2. In FIG. 14, when the values of $R_1$, $R_2$, $R_g$, and $R_f$ correspond to each other, for example, when $R_1=R_2=R_g=R_f$, the output voltage Vo1 of the first differential amplifier OP1 may be $V_2-V_1$, and the output voltage Vout of the second differential amplifier OP2 may be $REF1-(V_2-V_1)$.

Figure 15:
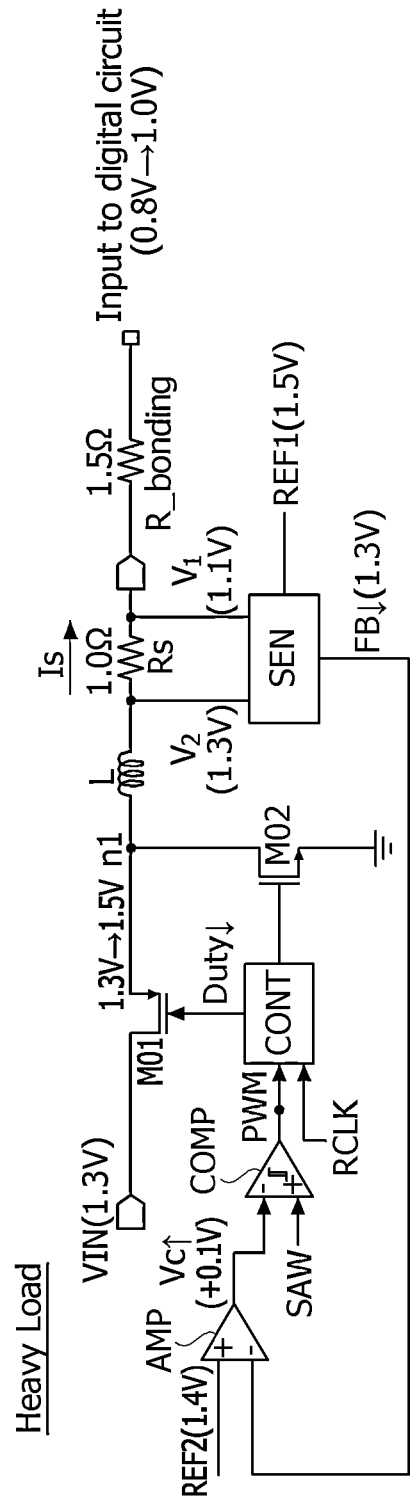
FIGS. 15 and 16 are circuit diagrams illustrating an operation of a buck converter shown in FIG. 11.
Figure 16:
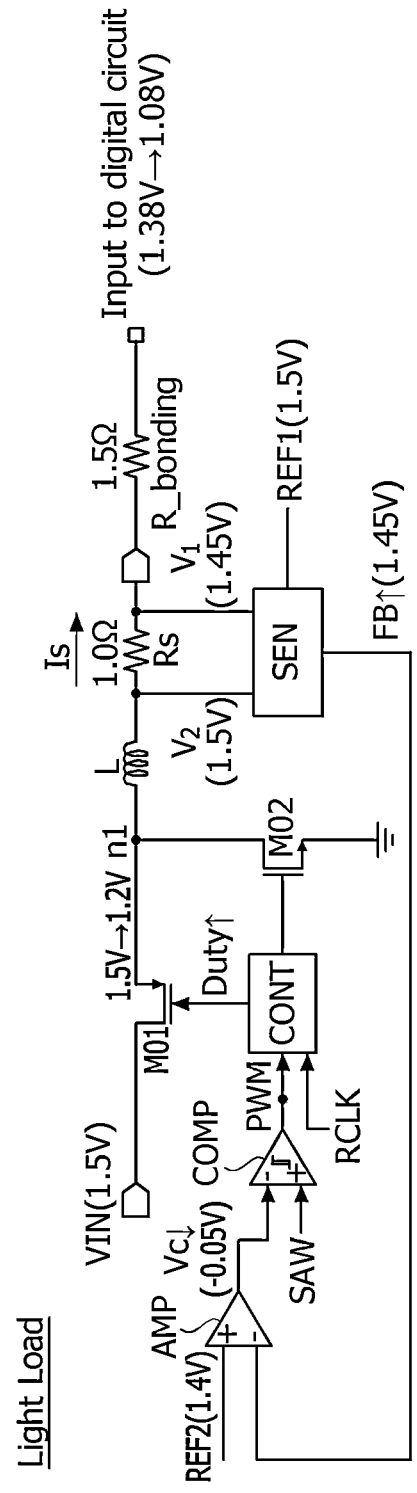

FIGS. 15 and 16 are circuit diagrams illustrating an operation of the power circuit 310 shown in FIG. 11.

Referring to FIG. 15, when the load is high (heavy load), the current Is flowing through the current sensing resistor Rs increases. At this time, the feedback voltage FB outputted from the sensing part SEN decreases, and the output voltage Vc of the amplifier AMP increases. As a result, the duty ratio of the PWM control signal PWM decreases and a voltage Vn1 of the first node n1 increases, so that the VDD voltage applied to the digital circuit 30 increases. In the example of FIG. 15, when Rs=1.0Ω, R_bonding=1.5Ω, Is=200 mA, $V_2$=1.3V, and $V_1$=1.1V, the feedback voltage FB decreases to 1.3V and the output voltage Vc increases by about +0.1V, reducing the duty ratio of the PWM control signal PWM, so that the voltage of the first node n1 increases from 1.3V to 1.5V, and the VDD voltage inputted to the digital circuit 30 increases from 0.8V to 1.0V. Here, 'R_bonding' is a bonding resistor.

Referring to FIG. 16, when the load is low (light load), the current Is flowing through the current sensing resistor Rs decreases. At this time, the feedback voltage FB outputted from the sensing part SEN increases, and the output voltage Vc of the amplifier AMP decreases. As a result, the duty ratio of the PWM control signal PWM increases and the voltage Vn1 of the first node n1 decreases, so that the VDD voltage applied to the digital circuit 30 decreases. In the example of FIG. 16, when Rs=1.0Ω, R_bonding=1.5Ω, Is=50 mA, $V_2$=1.5V, and $V_1$=1.45V, the feedback voltage FB increases to 1.45V and the output voltage Vc decreases by 0.05V, increasing the duty ratio of the PWM control signal PWM, so that the voltage of the first node n1 decreases from 1.5V to 1.2V, and the VDD voltage inputted to the digital circuit 30 decreases from 1.38V to 1.08V.

Table 1 below shows Is, Vs, FB, Vc, and Vn1, which change depending on the variation in the load connected to the power circuit 310 shown in FIGS. 15 and 16. In Table 1, "Vs" is a voltage between both ends of the current sensing resistor Rs and $Vs=Is*Rs=V_2-V_1$, and "a" is the gain of the amplifier AMP.

TABLE 1

| Load | Is (Current) | Vs[V] = Is * Rs = $V_2 - V_1$ | FB = REF1-Vs | Vc = a*REF2-FB | OUT_P |
|---|---|---|---|---|---|
| Heavy ↑ | 200 mA | 0.20 | 1.30 | 0.10 | 1.5 |
|  | 150 mA | 0.15 | 1.35 | 0.05 | 1.4 |
|  | 100 mA | 0.10 | 1.40 | 0.00 | 1.3 |
| Light ↓ | 50 mA | 0.05 | 1.45 | −0.05 | 1.2 |
|  | 0 mA | 0.00 | 1.50 | −0.10 | 1.1 |

Ex) REF2 = 1.4 V
REF1 = 1.5 V
Rs = 1Ω, R_bonding = 1.5Ω if a = 1

Figure 17:
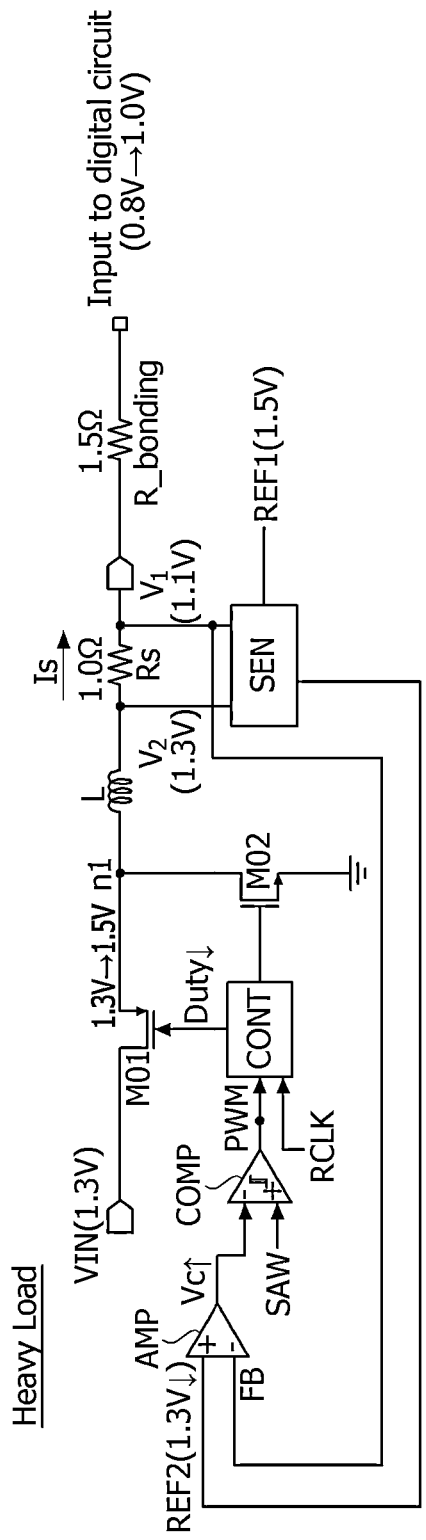
FIGS. 17 and 18 are circuit diagrams illustrating an operation of a buck converter shown in FIG. 13.
Figure 18:
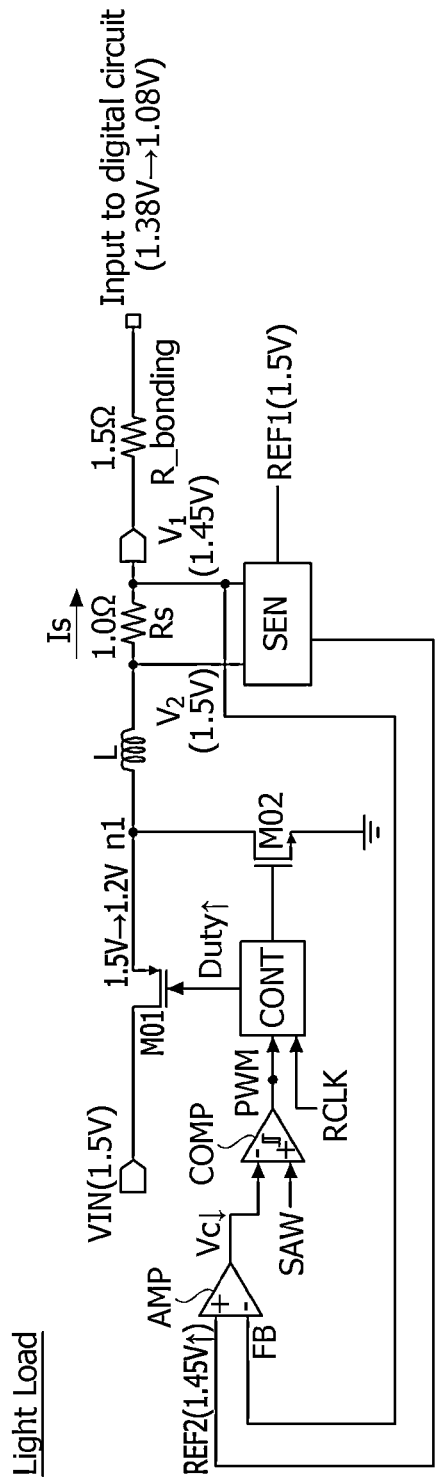

FIGS. 17 and 18 are circuit diagrams illustrating an operation of the power circuit 310 shown in FIG. 13.

Referring to FIG. 17, when the load is high (heavy load), the current Is flowing through the current sensing resistor Rs increases. At this time, the second reference voltage REF2 outputted from the sensing part SEN decreases, and the output voltage Vc of the amplifier AMP increases. As a result, the duty ratio of the PWM control signal PWM decreases and the voltage Vn1 of the first node n1 increases, so that the VDD voltage applied to the digital circuit 30 increases. In the example of FIG. 17, when Rs=1.0Ω, R_bonding=1.5Ω, Is=200 mA, $V_2$=1.3V, and $V_1$=1.1V, the second reference voltage REF2 decreases to 1.3V and the output voltage Vc increases, reducing the duty ratio of the PWM control signal PWM, so that the voltage Vn1 of the first node n1 increases from 1.3V to 1.5V, and the VDD voltage inputted to the digital circuit 30 increases from 0.8V to 1.0V.

Referring to FIG. 18, when the load is low (light load), the current Is flowing through the current sensing resistor Rs decreases. At this time, the second reference voltage REF2 outputted from the sensing part SEN increases, and the output voltage Vc of the amplifier AMP decreases. As a result, the duty ratio of the PWM control signal PWM increases and the voltage Vn1 of the first node n1 decreases, so that the VDD voltage applied to the digital circuit 30 decreases. In the example of FIG. 18, when Rs=1.0Ω, R_bonding=1.5Ω, Is=50 mA, $V_2$=1.5V, and $V_1$=1.45V, the second reference voltage REF2 increases to 1.45V and the output voltage Vc decreases, increasing the duty ratio of the PWM control signal PWM, so that the voltage Vn1 of the first node n1 decreases from 1.5V to 1.2V, and the VDD voltage inputted to the digital circuit 30 decreases from 1.38V to 1.08V.

Table 2 below shows Is, Vs, REF2, $V_1$, Vc, and Vn1, which change depending on the variation in the load connected to the power circuit 310 shown in FIGS. 17 and 18.

TABLE 2

| Load | Is (Current) | Vs[V] = Is * Rs = $V_2 - V_1$ | REF2 = REF1 - Vs | $V_1$ = $V_2$ - Vs | Vc = a*REF2 - $V_1$ | Vn1 |
|---|---|---|---|---|---|---|
| Heavy ↑ | 200 mA | 0.20 | 1.30 | 1.10 | 1.24 - $V_2$ | 1.5 |
|  | 150 mA | 0.15 | 1.35 | 1.15 | 1.23 - $V_2$ | 1.4 |
|  | 100 mA | 0.10 | 1.40 | 1.20 | 1.22 - $V_2$ | 1.3 |
| Light ↓ | 50 mA | 0.05 | 1.45 | 1.25 | 1.21 - $V_2$ | 1.2 |
|  | 0 mA | 0.00 | 1.50 | 1.30 | 1.20 - $V_2$ | 1.1 |

Ex) REF1 = 1.5 V

Rs = 1Ω, R_bonding = 1.5Ω if a = 0.8

The objects to be achieved by the present disclosure, the means for achieving the objects, and effects of the present disclosure described above do not specify essential features of the claims, and thus, the scope of the claims is not limited to the disclosure of the present disclosure.

It will be apparent to those skilled in the art that various modifications and variations can be made in the power circuit and the display device including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A power circuit, comprising:
    an output terminal configured to supply an output voltage to a digital circuit;
    a current sensing resistor connected to the output terminal;
    a sensing part configured to receive a first reference voltage and voltages of both ends of the current sensing resistor and vary one of a feedback voltage and a second reference voltage; and
    a voltage generation part configured to receive the feedback voltage and the second reference voltage and lowers the output voltage when a current flowing through the current sensing resistor decreases.

2. The power circuit of claim 1, wherein the voltage generation part includes a buck converter circuit in which the output voltage is lower than an input voltage.

3. The power circuit of claim 1, wherein the sensing part includes:
    a first differential amplifier configured to receive the voltages of both ends of the current sensing resistor; and
    a second differential amplifier configured to receive an output voltage of the first differential amplifier and the first reference voltage, wherein
    an output voltage of the second differential amplifier is one of the feedback voltage and the second reference voltage.

4. The power circuit of claim 3, wherein the voltage generation part includes:
    a first transistor and an inductor connected in series between an input terminal and the output terminal;
    a second transistor connected between a node between the first transistor and the inductor and a ground voltage source;
    a controller configured to control the first and second transistors; and
    an amplifier and a comparator connected between the sensing part and the controller, wherein
    the comparator receives an output voltage of the amplifier and a triangular wave voltage and outputs a pulse width modulation (PWM) control signal,
    the amplifier receives the second reference voltage and the feedback voltage,
    the controller controls the first and second transistors in response to the pulse width modulation control signal, and
    the current sensing resistor is connected between the inductor and the output terminal.

5. The power circuit of claim 4, wherein the feedback voltage outputted from the sensing part and the second reference voltage having a fixed voltage level are inputted to the amplifier, and
    the feedback voltage is varied when the current flowing through the current sensing resistor changes.

6. The power circuit of claim 5, wherein when the current flowing through the current sensing resistor decreases, the output voltage of the amplifier decreases, and the comparator increases a duty ratio of the pulse width modulation control signal to lower a voltage applied to the inductor.

7. The power circuit of claim 5, wherein when the current flowing through the current sensing resistor increases, the output voltage of the amplifier increases, and the comparator decreases a duty ratio of the pulse width modulation control signal to raise a voltage applied to the inductor.

8. The power circuit of claim 4, wherein the second reference voltage outputted from the sensing part and a node voltage between the current sensing resistor and the output terminal are inputted to the amplifier, and
    the second reference voltage is varied when the current flowing through the current sensing resistor changes.

9. The power circuit of claim 8, wherein when the current flowing through the current sensing resistor decreases, the output voltage of the amplifier decreases, and the comparator increases a duty ratio of the pulse width modulation control signal to lower a voltage applied to the inductor.

10. The power circuit of claim 8, wherein when the current flowing through the current sensing resistor increases, the output voltage of the amplifier increases, and the comparator decreases a duty ratio of the pulse width modulation control signal to raise a voltage applied to the inductor.

11. The power circuit of claim 1, wherein the first reference voltage is higher than the second reference voltage.

12. A display device, comprising:
    a display panel configured to display pixel data of an input image;
    a display panel driving circuit including a digital circuit driven by a VDD voltage and configured to write the pixel data to pixels of the display panel; and
    a power circuit configured to output the VDD voltage through a VDD output terminal, wherein the power circuit includes:
an output terminal configured to supply an output voltage to the digital circuit;
a current sensing resistor connected to the output terminal;
a sensing part configured to receive a first reference voltage and voltages of both ends of the current sensing resistor and vary one of a feedback voltage and a second reference voltage; and
a voltage generation part configured to receive the feedback voltage and the second reference voltage and lower the output voltage when a current flowing through the current sensing resistor decreases.

13. The display device of claim 12, wherein the voltage generation part includes a buck converter circuit in which the output voltage is lower than an input voltage.

14. The display device of claim 12, wherein the sensing part includes:
   a first differential amplifier configured to receive the voltages of both ends of the current sensing resistor; and
   a second differential amplifier configured to receive an output voltage of the first differential amplifier and the first reference voltage,
   wherein an output voltage of the second differential amplifier is one of the feedback voltage and the second reference voltage.

15. The display device of claim 14, wherein the voltage generation part includes:
   a first transistor and an inductor connected in series between an input terminal and the output terminal;
   a second transistor connected between a node between the first transistor and the inductor and a ground voltage source;
   a controller configured to control the first and second transistors; and
   an amplifier and a comparator connected between the sensing part and the controller, wherein
   the comparator receives an output voltage of the amplifier and a triangular wave voltage and outputs a pulse width modulation (PWM) control signal,
   the amplifier receives the second reference voltage and the feedback voltage,
   The controller controls the first and second transistors in response to the pulse width modulation control signal, and
   the current sensing resistor is connected between the inductor and the output terminal.

16. The display device of claim 15, wherein the feedback voltage outputted from the sensing part and the second reference voltage having a fixed voltage level are inputted to the amplifier, and
   the feedback voltage is varied when the current flowing through the current sensing resistor changes.

17. The display device of claim 15, wherein the second reference voltage outputted from the sensing part and a node voltage between the current sensing resistor and the output terminal are inputted to the amplifier, and
   the second reference voltage is varied when the current flowing through the current sensing resistor changes.

18. The display device of claim 12, wherein the first reference voltage is higher than the second reference voltage.

* * * * *